United States Patent
Jeon et al.

(10) Patent No.: US 7,986,099 B2
(45) Date of Patent: Jul. 26, 2011

(54) SWITCHING MODE POWER SUPPLY CIRCUIT FOR PLASMA DISPLAY PANEL

(75) Inventors: Peel Sik Jeon, Hwaseong-si (KR); Dong Kyun Ryu, Iksan-si (KR); Won Chan Choi, Seongnam-si (KR); Jae Han Yoon, Iksan-si (KR); Ki Mok Kim, Gyeonggi-do (KR); Jeong Rak Lee, Seoul (KR); Seung Heun Yang, Hwaseong-si (KR)

(73) Assignee: Samsung Electro-Mechanics Co., Ltd., Gyunggi-do (KR)

( * ) Notice: Subject to any disclaimer, the term of this patent is extended or adjusted under 35 U.S.C. 154(b) by 404 days.

(21) Appl. No.: 12/333,154

(22) Filed: Dec. 11, 2008

(65) Prior Publication Data

US 2010/0097006 A1 Apr. 22, 2010

(30) Foreign Application Priority Data

Oct. 20, 2008 (KR) .................. 10-2008-0102477

(51) Int. Cl.
*G09G 3/10* (2006.01)
(52) U.S. Cl. ............... 315/169.4; 315/160; 315/291; 315/307

(58) Field of Classification Search ............... 315/160, 315/169.4, 171, 174, 291, 307–308
See application file for complete search history.

(56) References Cited

U.S. PATENT DOCUMENTS

| 7,558,977 B2 * | 7/2009 | Kim et al. ............. 713/320 |
| 2008/0218503 A1 * | 9/2008 | Lee ....................... 345/211 |

FOREIGN PATENT DOCUMENTS

| KR | 10-2006-0036812 A | 5/2006 |
| KR | 10-2007-0058200 A | 6/2007 |

\* cited by examiner

*Primary Examiner* — Anh Q Tran
(74) *Attorney, Agent, or Firm* — Lowe, Hauptman, Ham & Berner, LLP

(57) ABSTRACT

The present invention relates to a switching mode power supply circuit for a plasma display panel comprising an input unit, a PFC (Power Factor Correction) unit, an output unit and a standby unit, wherein the standby unit includes a standby block for outputting a standby voltage by being connected to an AC filter stage of the input unit, a sequence block for sequentially applying power of the output unit and a control block which is connected between the standby block and the sequence block and inputs the standby voltage outputted from the standby block to the sequence block only in case that a PS_ON signal is applied.

3 Claims, 2 Drawing Sheets

[FIG. 1]
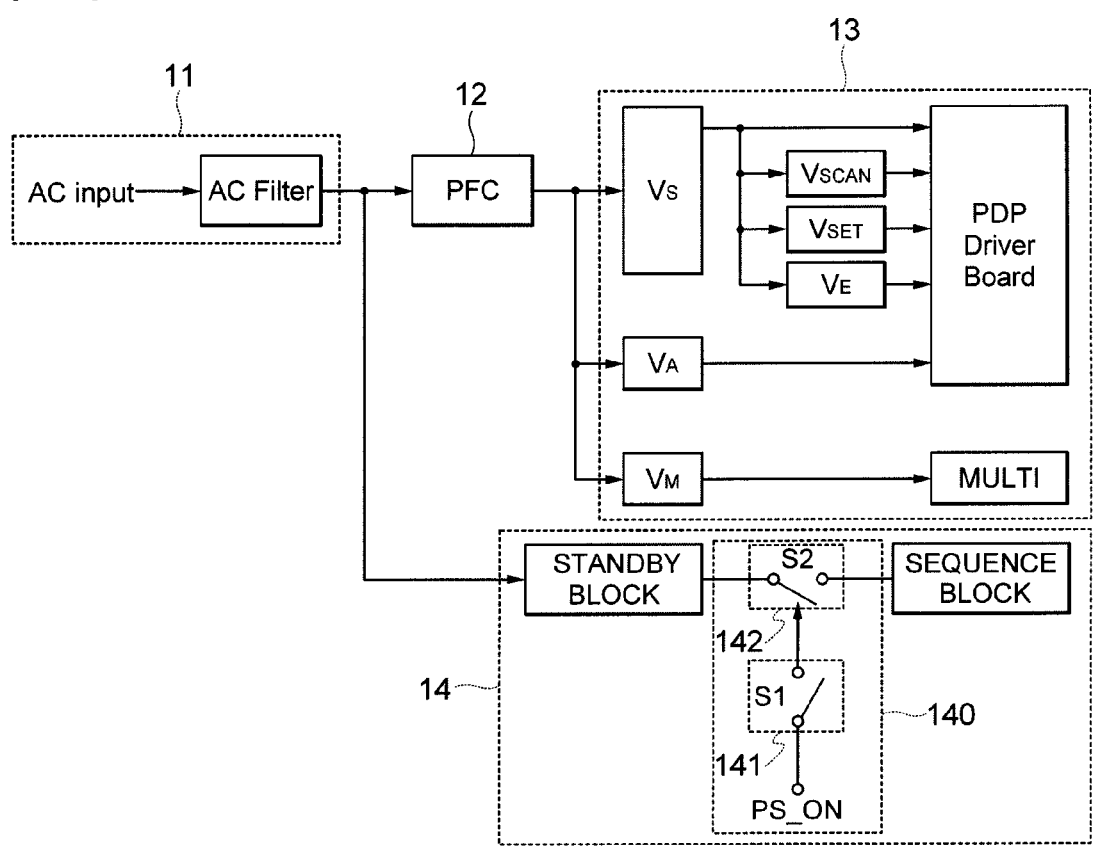

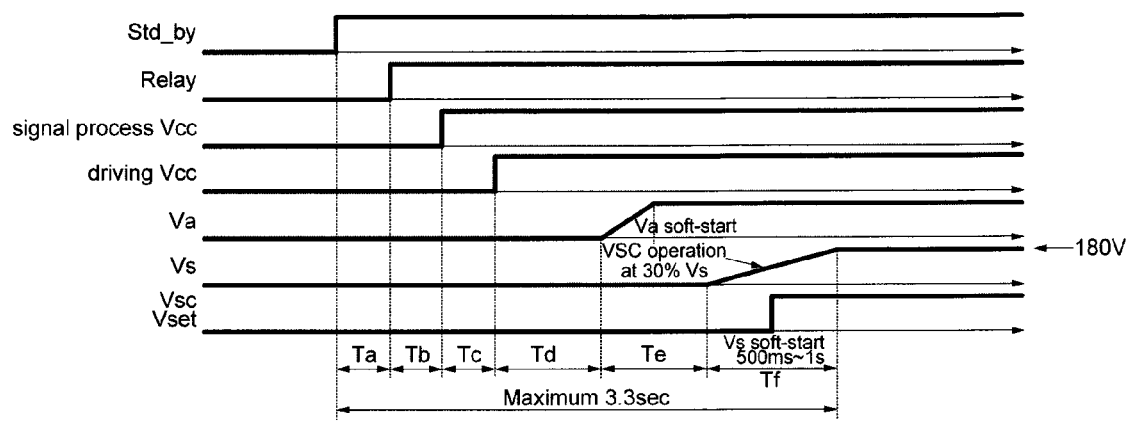
[FIG. 2]

SWITCHING MODE POWER SUPPLY CIRCUIT FOR PLASMA DISPLAY PANEL

CROSS-REFERENCE TO RELATED APPLICATIONS

This application claims the benefit of Korean Patent Application No. 10-2008-0102477 filed with the Korea Intellectual Property Office on Oct. 20, 2008, the disclosure of which is incorporated herein by reference.

BACKGROUND OF THE INVENTION

1. Field of the Invention

The present invention relates to a switching mode power supply circuit for a plasma display panel; and, more particularly, to a switching mode power supply circuit for a plasma display panel to interrupt a standby voltage inputted to a sequence block in a standby mode and input the standby voltage to the sequence block only in case that a PS_ON signal is applied.

2. Description of the Related Art

In general, a PDP (Plasma Display Panel) is a type of flat panel display employing a penning gas in a discharge phenomenon and uses a luminescence phenomenon caused by discharge generated between narrow electrodes coated with a dielectric by using a Ne or He gas and so on having relatively high pressure as a base gas.

The PDP needs an SMPS (Switching Mode Power Supply) circuit for driving thereof. The SMPS circuit is a module type power supply for converting electricity supplied from an outside to match with the PDP and plays roles of regulating a high frequency of more than a commercial frequency by using a semiconductor switching characteristic and buffering impact. Particularly, the SMPS circuit for the PDP needs to apply power to each component according to a specific sequence in order to protect a switching element and prevent abnormal discharge in initial application of the power.

Such a PDP has advantages in that reduction in thickness and weight can be achieved in comparison with a CRT (Cathode-Ray Tube) which has been a major part of a display device until now and a high-definition large-screen can be implemented and therefore it halves a flat panel display field together with an LCD (Liquid Crystal Display) currently.

However, recently, efforts to reduce standby power consumption in terms of the saving of energy have been briskly made around the world and thus a technology for reducing the standby power consumption in the above SMPS circuit is needed.

SUMMARY OF THE INVENTION

The present invention has been invented in order to overcome the above-described problems and it is, therefore, an object of the present invention to provide a switching mode power supply circuit for a plasma display panel capable of reducing standby power consumption by interrupting a standby voltage inputted to a sequence block in a standby mode and inputting the standby voltage to the sequence block only in case that a PS_ON signal is applied.

In accordance with one aspect of the present invention to achieve the object, there is provided a switching mode power supply circuit for a plasma display panel including an input unit; a PFC (Power Factor Correction) unit; an output unit; and a standby unit, wherein the standby unit includes a standby block for outputting a standby voltage by being connected to an AC filter stage of the input unit; a sequence block for sequentially applying power of the output unit; and a control block which is connected between the standby block and the sequence block and inputs the standby voltage outputted from the standby block to the sequence block only in case that a PS_ON signal is applied.

In accordance with the present invention, the control block includes a first switching device turned on in case that the PS_ON signal is applied; and a second switching device turned on in case that the first switching device is turned on by being positioned between the standby block and the sequence block.

In accordance with the present invention, the first switching device and the second device are transistors.

BRIEF DESCRIPTION OF THE DRAWINGS

These and/or other aspects and advantages of the present general inventive concept will become apparent and more readily appreciated from the following description of the embodiments, taken in conjunction with the accompanying drawings of which:

FIG. 1 is a block diagram showing a switching mode power supply circuit for a plasma display panel in accordance with one embodiment of the present invention; and FIG. 2 is a graph illustrating a power on sequence of the switching mode power supply circuit for the plasma display panel in accordance with the one embodiment of the present invention.

DETAILED DESCRIPTION OF THE PREFERABLE EMBODIMENTS

The present invention can several embodiments through various modifications, wherein preferable embodiments are shown in the accompanying drawings and will be described in detain in Detailed Description of the Preferable Embodiments. However, it should be understood that the present invention is not limited to the preferable embodiments and includes all modifications, equivalents and substitutions pertaining to the spirit and the technical scope of the present invention. In description of the present invention, if it is determined that detailed description of related published techniques makes the gist of the present invention vague, the detailed description will be omitted.

Although terms such as "first" and "second" can be used to describe various components, the components should not be limited to the terms. The terms are used only to distinguish one component from the other components.

The terms of the present invention are used only to describe the preferable embodiments but they are not aimed at limiting the present invention. A singular form includes a plural form as long as the singular form clearly does not mean a different thing from the plural form. It should be understood that in the present invention, terms such as "include" or "have" specify existence of a characteristic, a figure, a step, an operation, a component, a part or a combination thereof described in the specification and do not previously exclude existence or possibility of addition of one or more different characteristics, figures, steps, operations, components, parts or combinations thereof.

Hereinafter, a preferable embodiment for a switching mode power supply circuit for a plasma display panel in accordance with the present invention will be described in detail with reference to the accompanying drawings. In description of the preferable embodiment with reference to the accompanying drawings, the same or corresponding component is represented by the same reference numeral hereinafter and overlapping description thereof will be omitted.

FIG. 1 is a block diagram showing a switching mode power supply circuit for a plasma display panel in accordance with one embodiment of the present invention. Further, FIG. 2 is a graph illustrating a power on sequence of the switching mode power supply circuit for the plasma display panel in accordance with the one embodiment of the present invention.

Referring to FIG. 1 and FIG. 2, the switching mode power supply circuit for the plasma display panel in accordance with the one embodiment of the present invention includes an input unit 11, a PFC (Power Factor Correction) unit 12, an output unit and a standby unit 14.

The input unit 11 can include commercial line input power and an AC filter. The AC filter receives input of 90~270$V_{rms}$ from the commercial line input power by being directly connected to a commercial line input terminal and suppresses high frequency noise generated outside and a high frequency noise component generated inside.

The PFC unit 12 is connected to the AC filter of the input unit 11, outputs a DC voltage of approximately 370~400$V_{DC}$ by setting up or boosting-up the commercial line input power of 90~270$V_{rms}$ passing through the AC filter to avoid harmonic wave regulation, and supplies various power for driving the plasma display panel through a plurality of DC/DC converters.

Further, the PFC unit 12 for performing power factor improvement is positioned at a next stage to the input unit 11 and mainly employs Boost Topology having a high PFC performance.

The output unit 13 can include a plurality of DC/DC converters for supplying high voltage sustain driving power $V_S$ and address power $V_A$ and a DC/DC converter for supplying a plurality of low voltages $V_M$.

Further, output of the sustain driving power $V_S$ is used as the sustain driving power $V_S$ and also is inputted as a scan voltage $V_{SCAN}$ and reset voltages $V_{SET}$ and $V_E$ at the same time. Voltages outputted from the DC/DC converters are inputted to a plasma display panel driving board in order to drive the plasma display panel.

Meanwhile, a plurality of low voltage elements receiving the low voltages $V_M$ through the DC/DC converter for supplying the low voltages $V_M$ are represented by a single MULTI.

Referring to FIG. 2, the switching mode power supply circuit for the plasma display panel in accordance with one embodiment of the present invention applies the power in order shown in FIG. 2 by a sequence block of the standby unit 14, wherein the reason is as follow.

Generally, since the switching mode power supply circuit for the plasma display panel is characterized by a high voltage and a low current, it is highly influenced by switching loss rather than conduction loss.

Further, in case of the plasma display panel, since a very high surge current flows in discharge according to a luminescence principle, in case of a sustain voltage and an address voltage, a plurality of large capacitors should be added to a power and driving board in parallel and since a driving module of the plasma display panel supplies power to a lot of electrodes after rapidly switching the power needed for each of the electrodes, the plasma display panel consists mostly of switching elements using semiconductors.

Accordingly, the power should be applied in order shown in FIG. 2 so as to protect the switching elements and prevent the generation of abnormal discharge in initial application of the power.

Therefore, the power is applied in order of a low voltage system (signal process and driving Vcc), an address system Va, a sustain system Vs and it is general to remove the power in reverse order.

Meanwhile, the standby unit 14 can include a standby block, the sequence block and a control block 140.

The standby block can output the standby voltage by being connected to the AC filter stage of the input unit 11. The sequence block sequentially applies power of the output unit 13 and the control block 140 is connected between the standby block and the sequence block and inputs the standby voltage outputted from the standby block to the sequence block only in case that a PS_ON signal is applied.

The control block 140 can includes a first switching device 141 turned on in case that the PS_ON signal is applied and a second switching device 142 turned on in case that the first switching device 141 is turned on by being positioned between the standby block and the sequence block.

It is preferable that the first switching device and the second switching device can be transistors.

Conventionally, since the standby voltage is inputted to the sequence block even in a standby mode where only the standby voltage is outputted from the standby block of the standby unit 14, unnecessary power is consumed due to a resistor, a transistor, a comparator and so on inside the sequence block.

However, the switching mode power supply circuit for the plasma display panel in accordance with one embodiment of the present invention has an advantage in that reduction in standby power consumption can be achieved in comparison with the conventional switching mode power supply circuit by interrupting the standby voltage inputted to the sequence block in the standby mode and inputting the standby voltage to the sequence block only in case that the PS_ON signal is applied.

As described above, the present invention can reduce the standby power consumption in comparison with the conventional switching mode power supply circuit by interrupting the standby voltage inputted to the sequence block in the standby mode and inputting the standby voltage to the sequence block only in case that the PS_ON signal is applied.

As described above, although the preferable embodiments of the present invention have been shown and described, it will be appreciated by those skilled in the art that substitutions, modifications and changes may be made in these embodiments without departing from the principles and spirit of the general inventive concept, the scope of which is defined in the appended claims and their equivalents.

What is claimed is:

1. A switching mode power supply circuit for a plasma display panel comprising:
   an input unit;
   a PFC (Power Factor Correction) unit;
   an output unit; and
   a standby unit,
   wherein the standby unit includes:
   a standby block for outputting a standby voltage by being connected to an AC filter stage of the input unit;
   a sequence block for sequentially applying power of the output unit; and
   a control block which is connected between the standby block and the sequence block and inputs the standby voltage outputted from the standby block to the sequence block only in case that a PS_ON signal is applied.

2. The switching mode power supply circuit for the plasma display panel of claim 1, wherein the control block includes:

a first switching device turned on in case that the PS_ON signal is applied; and a second switching device turned on in case that the first switching device is turned on by being positioned between the standby block and the sequence block.

3. The switching mode power supply circuit for the plasma display panel of claim 2, wherein the first switching device and the second device are transistors.

* * * * *